March 27, 1934. C. A. TURNER 1,952,397
VALVE SUPERVISORY AND SIGNAL UNIT
Filed Dec. 14, 1927 2 Sheets-Sheet 2
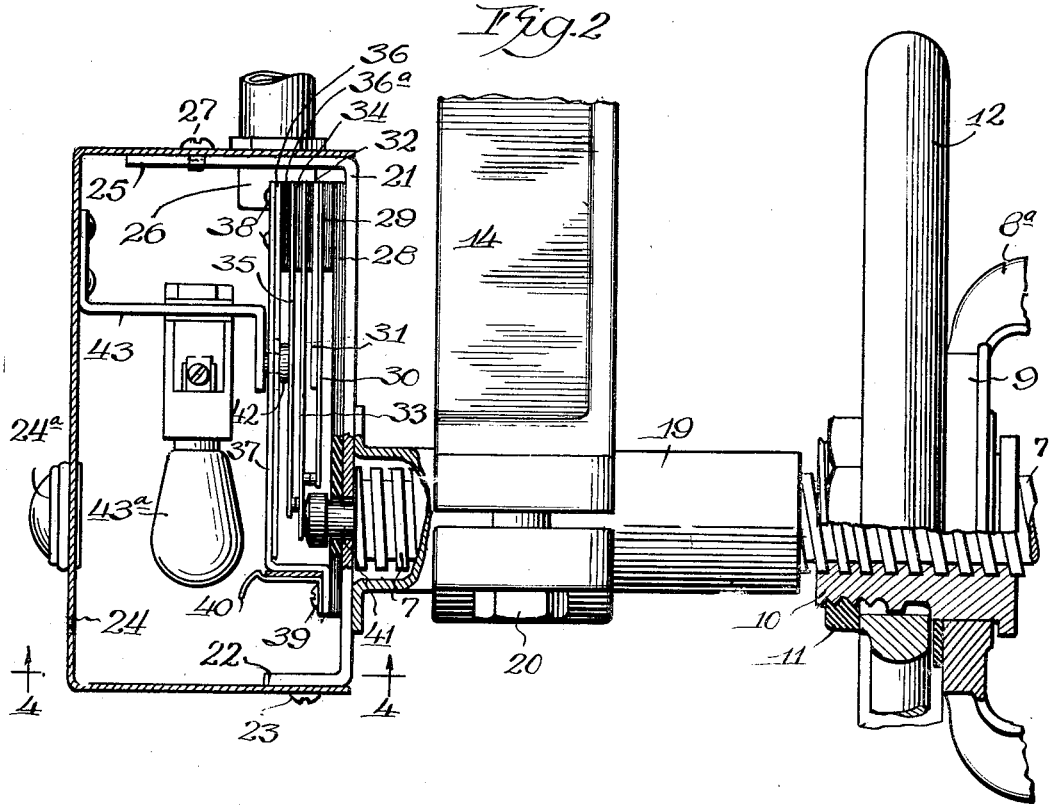
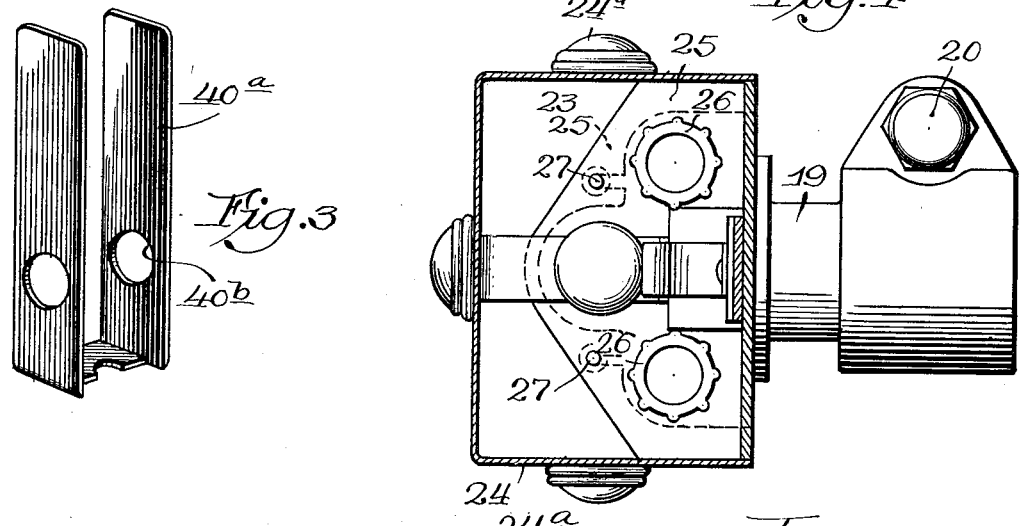
Witness:
Chas. R. Loursh.
Inventor,
Charles A. Turner
Benj. J. Roodhouse, Atty.

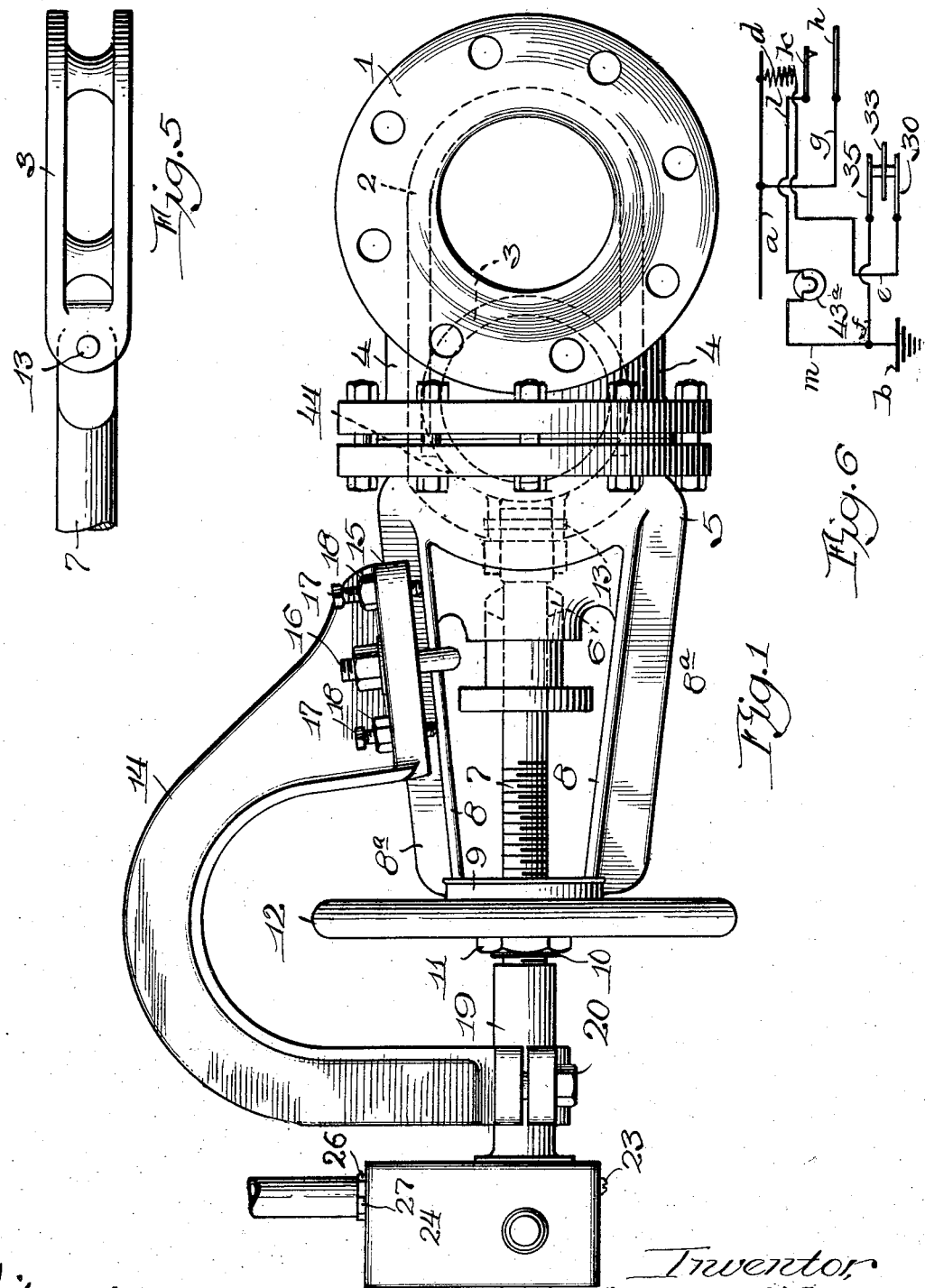

Patented Mar. 27, 1934

1,952,397

UNITED STATES PATENT OFFICE 1,952,397

VALVE SUPERVISORY AND SIGNAL UNIT

Charles A. Turner, Chicago, Ill., assignor, by mesne assignments, to Howe Manufacturing Company, Chicago, Ill., a corporation of Illinois Application December 14, 1927, Serial No. 239,937

4 Claims. (Cl. 177—311)

My present invention relates to the provision of a valve supervisory and signal unit and has to do with the organization of instrumentalities for supervising the position of the stem and gate or closure element of valves such as are employed in sprinkler systems.

As is well known by persons familiar with the construction and operation of such systems, the valves must be maintained in an open position except as those relatively infrequent times when inspection, adjustment, replacement and repair are necessary.

It has been my object to provide a simple and effective mechanism which shall in no way interfere with the manipulation of the valve and will afford control of signals, both local and remote, indicating when the valve is in proper open position and when it is out of properly adjusted open position, either by reason of being closed or partially closed or opened or retracted so far as to become jammed.

The type of valve uniformly used in such situations comprises a stem and a closing element moved by the stem, and the stem is usually coupled with the closing element by means of a coupling pin.

A further object has been to render the supervisory apparatus tamper proof, and for this purpose I have employed instrumentalities whereby when the cover of the unit on the stem is displaced or removed, signals will be made of that fact.

I have attained the aforementioned objects by means of the structures and arrangements illustrated in the accompanying drawings, in which—

Fig. 1 is a side elevation of a valve and yoke with my device assembled therewith, Fig. 2 is a vertical front to rear central section of the housing for the contacts and light showing its relation to the valve stem and housing hanger bracket, Fig. 3 is a perspective of the U shaped removable piece enclosing the sides of the contacting blades, Fig. 4 is a section on line 4—4 shown in Fig. 2 looking in the direction of arrows.

Fig. 5 is a side view of the valve gate with a fragment of the stem attached; and Fig. 6 is a schematic diagram of the electric circuit involved in the operation of my device.

While my device may be easily adapted for different forms of valves, a typical form of valve with which my device is to be assembled is illustrated in Figs. 1 and 2 of the drawings and consists of a flanged section of pipe 1 included in the pipe line which the valve is to control. Within the section of pipe 1 is a semi-circular transverse groove or channel 2 for receiving the end of the valve gate 3 (shown in detail in Fig. 5) when the valve is closed. The section of pipe 1 is produced on the side opposite to the groove, as at 4, to provide a portion of a housing to receive the gate when it is in retracted position. The produced portion 4 is flanged and to this flange is bolted a flanged yoke section 5, which provides the crown or top of the gate housing, a stuffing box 6 for the valve stem 7, and the yoke arms 8 joined by an apertured plate 9 in which aperture is journaled an interiorly threaded flanged collar 10 which takes the threaded valve stem 7 and to which is secured by the nut 11 the hand wheel 12 by the rotation of which the valve stem is fed in either direction through the collar 10 to either open or close the valve, as the case may be. The valve stem and gate are secured together by a coupling pin 13. Such valves are very substantially made and operatives actuated by a desire to be sure that they are entirely open sometimes turn the hand wheel so as to withdraw the stem out too far and the structure is jammed so that it cannot be closed when occasion arises for so doing. As will hereafter be seen, my apparatus is arranged to signal, if the valve stem is retracted too far so that a jammed condition cannot be unknowingly produced.

The yoke arms are ordinarily provided with a strengthening outwardly extending flange or rib 8a. These valves are preferably mounted so as to extend horizontally out from the branch main or lateral in the direction from which they will be approached. My valve supervisory and signal unit is secured immediately in front of the hand wheel by means of the U shaped bracket 14, one end of which is produced into a grooved saddle or yoke 15 to fit over the flange 8a of preferably the upper yoke arm so that there are no obstructions to interfere with an approach to or manipulation of the hand wheel from the front or either side. This saddle is held in proper relation to the yoke by means of the bow 16, which partly encircles the yoke arm and the adjusting set screws 17 with lock nuts 18. This manner of fastening provides all suitable adjustments of the unit with relation to the stem. The end of the bracket 14 opposite the yoke or saddle 15 is enlarged and bored and split to receive a barrel or tube 19 which is held in desired assembly by the headed nut 20 by means of which the split end of the bracket is constricted about the barrel. The barrel 19 is centered with respect to the axis of the threaded valve stem 7 so that when the valve is opened, by turning the hand wheel 12, the stem will extend into the barrel 19. The upper end of the barrel 19 is somewhat flared and flanged and to the flange is secured by rivets, or screws, or in any other desired way, the base portion 21 of the casing for the electrical instrumentalities shown in Fig. 2. This base 21 is a rectangular piece of metal flanged forwardly at its lower edge 22 in a rectangular flange of sufficient dimensions to take screw 23 for securing the cover 24 to the base. The upper end of the base 21 is also flanged forwardly, as at 25, but in this case the flange is much wider and has an angular outer end so as to provide ample room for assemblying therewith the usual conduit elements 26. Headed machine screws 27 extend into tapped holes in the flange 25 in order to secure the top 24 in place, which is cut away on its upper end about the area occupied by the conduit connections and is slotted on its top and bottom edges to receive the shanks of screws 23 and 27.

The electrical elements are mounted on the inner face of the base plate 21 and consist of a bottom plate of insulating material 28 spaced from which by a block of insulating material 29, located at the upper end of the plate 28, is a contact blade 30, above which is a stop plate 31. The contact blade 30 is flexed to spring upwardly against the stop plate 31, when the cover is removed, which stop plate limits the upward movement of the blade 30. A second insulating block 32 in front or above the insulating block 29 spaces the stop blade 31 from a second contact blade 33, the lower or unattached end of which extends beyond the contact blade 30. Another insulating block 34 aligning with the blocks 29 and 32 separates the contact blade 33 from a third contact blade 35 somewhat shorter than the contact blade 33. The contact blades 30, 33 and 35 are preferably provided with the usual contact buttons. A plate of insulating material 36 separated from the blade 35 by an insulating block 36a extends in front of the contact blades 30, 33 and 35, and over the whole extends a metal strap 37 down through the end of which opposite the spacing blocks pass the machine screws 38 into tapped holes in plate 21 to hold the foregoing assembly in position. The opposite end of the strap 37 is bent inwardly toward the plate 21 and again downwardly parallel with plate 21 to receive a machine screw 39 which holds a latch 40, the strap 37 and the insulating plate 28 to the base 21. The connecting flange of the U shaped member 40a, shown in Fig. 3, is removably held by the latch 40 to protect the sides of the contact blades, and the arms of this member are oppositely apertured, as at 40b, to permit a view of the contact buttons.

The base 21 and insulating plate 28 are bored axially of the valve stem 7 for the receipt of the stem of a headed button 41 made of insulating material which is so proportioned that when the stem 7 is properly adjusted in open position for the valve the head of the button 41 will hold the intermediate contact plate buttons carried by these respective blades in contact, and if the stem is retracted too far so as to be liable to jam, the button 41 will be forced further in and will break contact between blades 30 and 33. On the other hand, the intermediate blade 33 is sufficiently strongly flexed to carry both itself and blade 30 downwardly and break contact with blade 35 when the valve stem feeds inwardly and ceases to support blade 33. The plate of insulating material 36 and the cover strap 37 are bored for the passage of the shank of a headed button 42 made of insulating material, the head of which rests upon the contact plate 35 which is flexed to spring upwardly out of contact through the buttons carried by the respective blades with contact blade 33. To the inside of the cover 24 is secured a right angle lamp bracket 43, the outer unattached end of which is turned downwardly and proportioned so as to contact the shank of the button 42 when the cover is in position and depresses the contact blade 35 into contact with contact blade 33.

As the opposite poles of the circuit are connected respectively with the contact blades 30 and 35, as will hereafter be described, the removal of the top of the casing 24 or its displacement will cause the interruption of the circuit as well as the movement of the valve stem so that the cover of the box cannot be disturbed or tampered with without giving a signal.

As will hereafter be seen, the breaking of the circuit within which the contacts are interposed operates a relay to close an alarm circuit in which is the light bulb 43a carried by the bracket 43 is included. The cover 24 of the box is provided with bulls eyes 24a, the extinguishment of which indicates the proper setting of the valve and cover 24.

The schematic circuit shown in Fig. 6 illustrates the poles, a, b, of the supply circuit. From pole a conductor c leads to a relay winding d from which conductor e leads to blade 30 which contacts through blade 33 with blade 35 from which leads conductor f to ground or the opposite pole b of the supply circuit. Conductor g branches from conductor c to relay blade h. Relay blade k which is maintained out of contact with blade h when the relay winding is energized is connected by conductor l with a pole of lamp 43a from the opposite pole of which conductor m leads to ground or opposite supply pole b. From which it will be seen that when contact is broken between blades 30, 33 and 35, either by the movement of the valve stem 7 or the removal of the cover 25, lamp 43a will be illuminated as well as causing the energizing of any other signals which may be desired through the action of the relay.

Having described my invention what I claim as new and desire to secure by Letters Patent is:

1. A valve supervisory and alarm device comprising a bracket, means for adjustably securing said bracket to a valve, an articulated casing held by said bracket axially of the stem of said valve, an insulating button movably mounted in said casing in co-active relation with the stem of said valve, three contact blades respectively secured at one end within said casing, means carried by a removable element of said casing for holding an outside blade in co-active relation with the center blade, said center blade co-operatively related to said button and flexed to yieldingly resist the action thereof when moved by said stem, said other outside blade being flexed to partially counter the spring action of said center blade, a stop to limit the counter action of said last mentioned blade, a light bulb mounted within said casing, a relay including an armature the circuit through the coil of which relay is completed through said blades and a derived circuit including said armature closed by said relay, which derived circuit includes said lamp but bridges the coil of said relay and said blades.

2. A valve supervisory and alarm device comprising an articulated casing, an insulating button movably mounted in said casing, three contact blades respectively secured at one end within said casing, means carried by a removable element of said casing for holding an outside blade in co-active relation with the center blade, said center blade co-operatively related to said button and flexed to yieldingly resist the action thereof, said other outside blade being flexed to partially counter the spring action of said center blade, a stop to limit the counter action of said last mentioned blade, a light bulb mounted within said casing, a relay including an armature the circuit through the coil of which relay is completed through said blades and a derived circuit including said armature closed by said relay, which derived circuit includes said lamp but bridges the coil of said relay and said blades.

3. A supervisory and alarm device including a button of insulating material movably mounted, three contact blades in electrical series relation each respectively secured at one end, the center one of said blades co-operatively related to said button and flexed to yieldingly resist the action thereof, one of the outside blades being flexed to partially counter the action of said center blade, a stop to limit the counter action of said blade, a casing for said structure and means carried by said casing for holding the other of said outside blades in normal co-operative relation with said center blade, a lamp, a relay including an armature the circuit through the coil of which relay is completed through said three blades and a derived circuit closed by said armature, which derived circuit includes said lamp but bridges the coil of said relay and said three blades.

4. A supervisory and alarm device including a button of insulating material movably mounted, three contact blades in electrical series relation each respectively secured at one end, the center one of said blades co-operatively related to said button and flexed to yieldingly resist the action thereof, one of the outside blades being flexed to partially counter the action of said center blade, a stop to limit the counter action of said blade, a casing for said structure and means carried by said casing for holding the other of said outside blades in normal co-operative relation with said center blade, a relay, the circuit through the coil of which relay is completed through said blades.

CHARLES A. TURNER.